(12) United States Patent
Vivanco et al.

(10) Patent No.: US 9,385,931 B1
(45) Date of Patent: Jul. 5, 2016

(54) DETERMINING A REORDERING TIMER

(75) Inventors: Daniel Vivanco, Reston, VA (US);
Kyounghwan Lee, Herndon, VA (US);
Yu Zhou, Herndon, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 35 days.

(21) Appl. No.: 13/415,239

(22) Filed: Mar. 8, 2012

(51) Int. Cl.
*H04L 12/26* (2006.01)

(52) U.S. Cl.
CPC ........ *H04L 43/0847* (2013.01); *H04L 12/2673* (2013.01)

(58) Field of Classification Search
CPC ............ H04L 12/2657; H04L 12/2673; H04L 12/2692; H04L 12/2642; H04L 47/624; H04L 29/08675; H04L 43/028; H04L 69/30; H04L 69/16; H04L 43/0847; H04T 2001/203; H04W 28/06; H04W 28/065
USPC ........................................................ 370/235
See application file for complete search history.

(56) References Cited

U.S. PATENT DOCUMENTS

| 6,246,684 | B1 * | 6/2001 | Chapman et al. ............. 370/394 |
| 6,711,169 | B1 * | 3/2004 | Jackson ..................... 370/395.1 |
| 7,145,897 | B2 | 12/2006 | Sachs et al. |
| 2008/0151921 | A1 * | 6/2008 | Gentle et al. .................. 370/412 |
| 2010/0070668 | A1 * | 3/2010 | Maruyama et al. ........... 710/261 |
| 2010/0329119 | A1 * | 12/2010 | Zorba Barah et al. ........ 370/235 |
| 2011/0149919 | A1 | 6/2011 | Kapoor et al. |
| 2011/0230172 | A1 * | 9/2011 | Pollin et al. ................ 455/414.1 |
| 2011/0289538 | A1 * | 11/2011 | Begen et al. .................. 725/107 |
| 2012/0054248 | A1 * | 3/2012 | Mehrotra et al. ............. 707/803 |

* cited by examiner

*Primary Examiner* — Mark Rinehart
*Assistant Examiner* — Ellen A Kirillova

(57) ABSTRACT

In systems and method of determining a reordering timer in a wireless communication network, it is determined that a packet reordering of a plurality of data packets meets a reordering threshold, and the plurality of data packets is examined to determine a reordering severity of the plurality of data packets. Based on the determined reordering severity and an application requirement associated with the plurality of data packets, a reordering timer is determined.

6 Claims, 5 Drawing Sheets

DETERMINING A REORDERING TIMER

TECHNICAL BACKGROUND

In a typical packet-switched network, the delivery, arrival time, and order of data transfer units, referred to herein as "packets", are not guaranteed. Packet reordering occurs when packets are received at a destination out of sequence. Packet reordering can impede the performance of applications requiring the packets, and can also lead to decreased network throughput, unnecessary packet retransmissions, improper sizing of a network congestion window, and obscuring of packet loss.

OVERVIEW

Systems and method of determining a reordering timer in a wireless communication network are provided. When it is determined that a packet reordering of a plurality of data packets meets a reordering threshold, the plurality of data packets is examined to determine a reordering severity of the plurality of data packets. Based on the determined reordering severity and an application requirement associated with the plurality of data packets, a reordering timer is determined.

DETAILED DESCRIPTION

In an embodiment, an indication of packet reordering of a plurality of data packets is received. For example, an indication of packet reordering can be received from an access node at a network node. When it is determined that the packet reordering of the plurality of data packets meets a reordering threshold, the plurality of data packets is examined to determine a reordering severity of the plurality of data packets. In an embodiment, the plurality of packets are examined using deep packet inspection. Based on the determined reordering severity and an application requirement associated with the plurality of data packets, a reordering timer is determined.

Figure 1A:
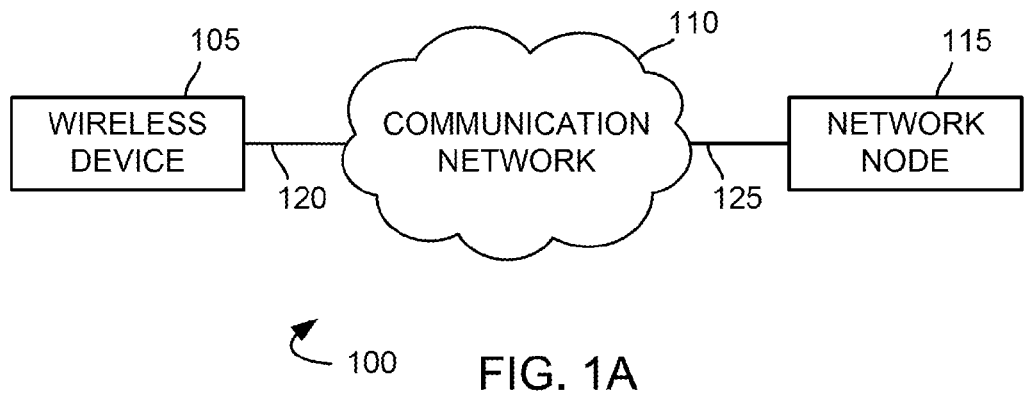
FIG. 1A illustrates an exemplary communication system to determine a reordering timer.

FIG. 1A illustrates an exemplary communication system 100 to determine a reordering timer comprising wireless device 105, communication network 110, and network node 115. Examples of a wireless device 105 can include a cell phone, a smart phone, a computing platform such as a laptop, palmtop, or tablet, a personal digital assistant, an internet access device, or other device capable of wireless communication, including combinations thereof. Wireless device 105 is in communication with communication network 110 over communication link 120. Communication network 110 comprises base stations, wireless communication nodes, telephony switches, internet routers, network gateways, computer systems, communication links, or some other type of communication equipment, including combinations thereof. Communication network 110 is in communication with network node 115 over communication link 125. Network node 115 is configured to determine a reordering timer, as further described below.

Communication links 120 and 125 can be wired or wireless communication links. Wired communication links can be, for example, twisted pair cable, coaxial cable, fiber optic cable, or combinations thereof. Wireless communication links can be a radio frequency, microwave, infrared, or other similar signal, and can use a suitable communication protocol, for example, code division multiple access (CDMA) 1×RTT, Universal Mobile Telecommunications System (UMTS), High-Speed Packet Access (HSPA), Evolution Data Optimized (EV-DO), EV-DO rev. A, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between wireless device 105, communication network 110 and network node 115 which are omitted for clarity, including additional processing nodes, routers, gateways, and physical and/or wireless data links for carrying data among the various network elements.

Packet reordering describes when packets, such as internet protocol (IP) packets or datagrams, are received at a destination out of sequence. Packet reordering can be caused, for example, by local parallelism within a packet router or a traffic split among multiple links, where different link delays may introduce packet reordering. Packet reordering may also originate, for example, in a core network and be propagated down to a backhaul and access network, though packet reordering may also originate at the access network, for instance when a wireless device is handed over from one cell to another cell.

Figure 1B:
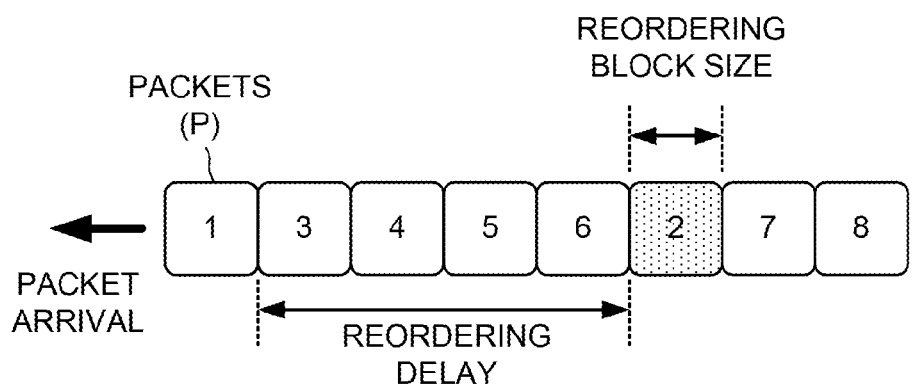
FIGS. 1B and 1C illustrate exemplary packet reordering.
Figure 1C:
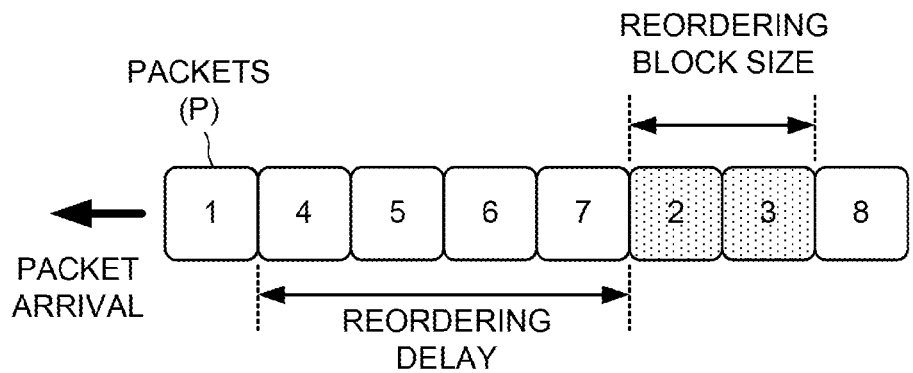

Repeated cases of packet reordering can negatively impact applications which require a minimum data throughput from a network. Referring to FIG. 1B, in the case of an application requiring data from a network employing transfer control protocol (TCP), when a TCP network element receives a packet, it requests the next packet with an acknowledgement (ACK). When the TCP network element receives a packet out of sequence, it sends a duplicated acknowledgment (dupACK) to request that the sender resend the packet. For example, when a first packet P1 arrives, the receiver sends an ACK to request the next packet P2. If a third packet P3 arrives subsequently instead of packet P2, which indicates that P2 is missing, the receiver sends an ACK for P2 again (one dupACK). According to the TCP standard, receipt of three dupACKs is typically considered an indication that a packet lost. Thus, if a reordered packet causes three or more dupACKs, the receiver will incorrectly conclude that P2 has been lost, and will call for a fast retransmit of packet P2. Accordingly, the receiver will request an unnecessary fast retransmit (a false fast retransmit) to retransmit packet P2. FIG. 1B illustrates a reordering delay of four packets, since packet P2 arrives out of order, after packet P6. FIG. 1C also illustrates a reordering delay of four packets, and further illustrates a reordering block size of two packets (P2 and P3). FIGS. 1B and 1C are further described below.

In such circumstances, TCP application and network performance can be impaired. TCP uses a sliding window flow control protocol. In each TCP segment, the receiver specifies in a receive window the amount of additional received data that it is willing to receive in a period of time. The sender can send an amount of data up to the receive window, and typically the sender must wait for an acknowledgment and a window update from the receiver to transmit more data. The TCP receive window is reduced after fast retransmits, which can lead to delays in packet transmission and to throughput reduction. Further, network bandwidth can be unnecessarily consumed since the sender will resend data segments that were actually not lost. Moreover, packet reordering may also cause interruptions on the TCP ACK clock thereby causing data transmission to be more bursty.

Network protocols typically provide functions to reduce out-of-sequence packet delivery. For example, the Radio Link Control (RLC) protocol of Long Term Evolution (LTE) uses availability of IP packets for a given TCP connection to control in-sequence IP packets delivery. RLC can be implemented on a network node, such as an access node, and on a wireless device. An RLC entity typically comprises a sending side (which sends RLC packets to a MAC layer) and a receiving side (which receives RLC packets from the MAC layer). To control in-sequence IP packet delivery, RLC can insert sequence numbers in RLC packets which carry the IP packets for the given TCP connection.

In operation, a receiver maintains a reordering timer which is started when an expected RLC packet is not received and which runs for a predetermined duration. Inaccurate selection of a reordering timer value can lead to false fast retransmits if too short, and conversely may create unnecessary delay if too long. During the duration of the reordering timer the receiver waits for the missing packet and buffers subsequently received packets. If the missing packet is received before the reordering timer elapses, the received packets are re-sequenced in order and delivered to an upper layer in the protocol stack. If the missing packet is not received within the duration of the reordering timer, the packets that were received out of sequence and buffered awaiting re-sequencing are delivered to the upper layer.

In an embodiment, at network node 115 it is determined that a packet reordering of a plurality of data packets meets a reordering threshold. When the packet reordering meets the reordering threshold, the plurality of data packets is examined to determine a reordering severity of the plurality of data packets. Based on the determined reordering severity and an application requirement associated with the plurality of data packets, reordering timer is determined. Thus, a reordering timer can be dynamically determined.

Figure 2:
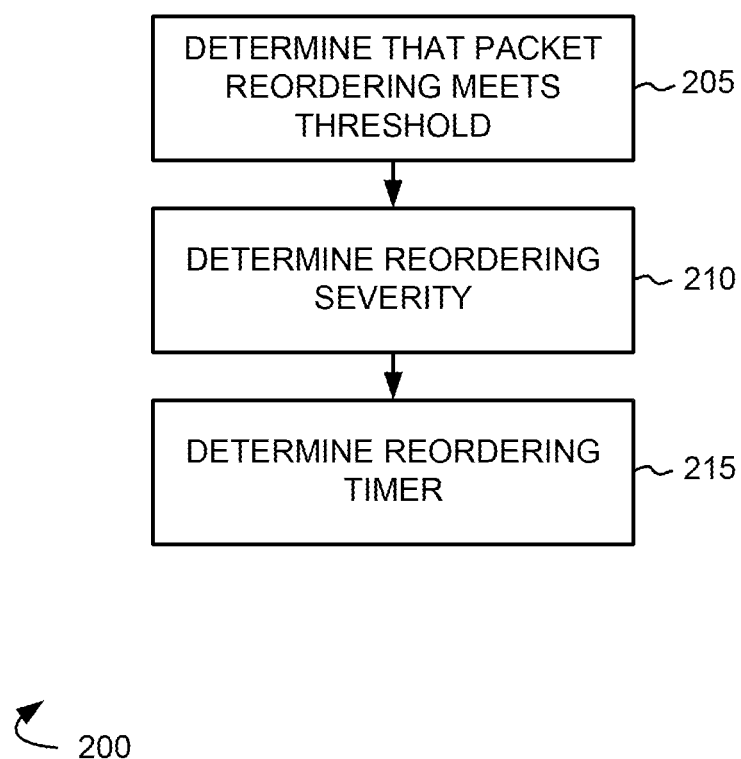
FIG. 2 illustrates an exemplary method of determining a reordering timer.

FIG. 2 illustrates an exemplary method 200 of determining a reordering timer. In operation 205, it is determined at network node 115 that a packet reordering of a plurality of data packets meets a reordering threshold. The plurality of data packets is examined at network node 115 when the packet reordering meets the reordering threshold to determine a reordering severity of the plurality of data packets (operation 210). In operation 215, a reordering timer is determined based on the determined reordering severity and an application requirement associated with the plurality of data packets. In an embodiment, packet reordering is assumed to originate from a network beyond communication network 110, such as the Internet, or from the core network or backhaul of communication system 100.

Figure 3:
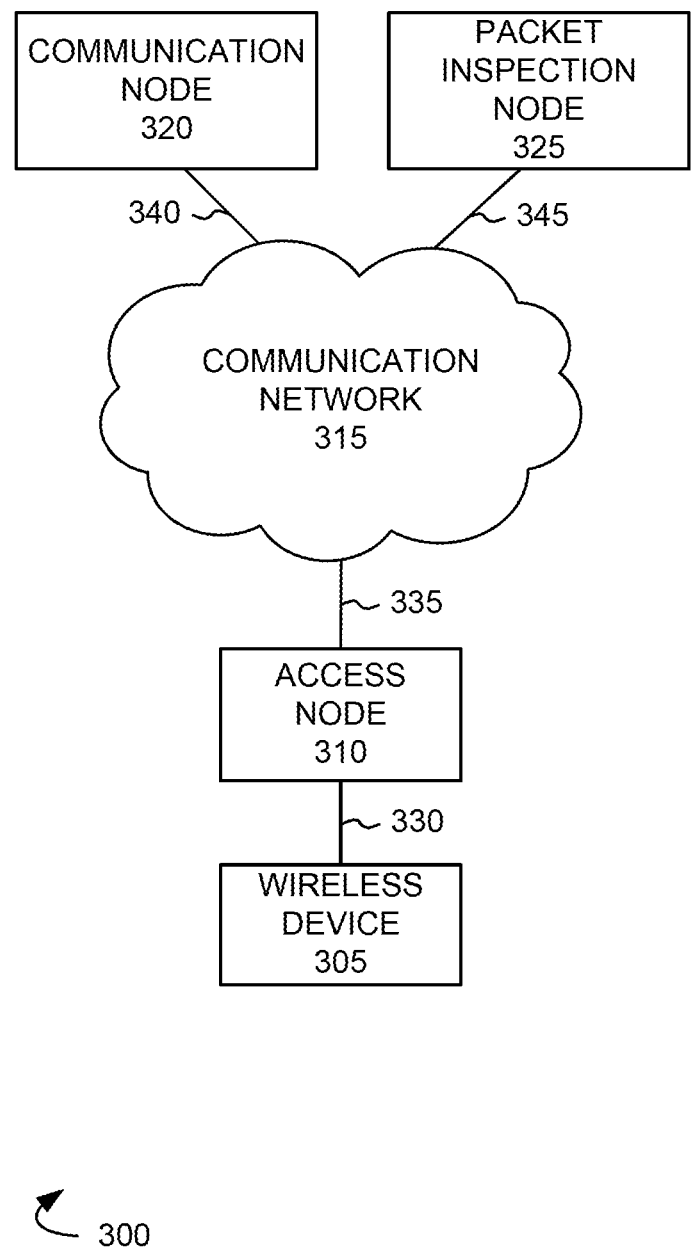
FIG. 3 illustrates another exemplary communication system to determine a reordering timer.

FIG. 3 illustrates another exemplary communication system 300 to determine a reordering timer comprising wireless device 305, access node 310, communication network 315, communication node 320 and packet inspection node 325. Examples of wireless device 305 can include a cell phone, a smart phone, a computing platform such as a laptop, palmtop, or tablet, a personal digital assistant, an internet access device, or other device capable of wireless communication, including combinations thereof.

Access node 310 is in communication with wireless device 305 through communication link 330 and with communication network 315 through communication link 335. Access node 310 is a network node capable of providing wireless communications to wireless device 305, and can be, for example, a base transceiver station and an eNodeB device. Communication network 315 is in communication with communication node 320 over communication link 340 and with packet inspection node 325 over communication link 345. Communication network 315 comprises base stations, wireless communication nodes, telephony switches, internet routers, network gateways, computer systems, communication links, or some other type of communication equipment, including combinations thereof.

Packet inspection node 325 is a network node configured to determine a reordering timer. Communication node 320 is a network node which manages communication sessions with wireless device 305. Communication node 320 can, for example, manage session states, authentication, paging, mobility with other network elements, including other wireless devices, roaming, and can perform additional bearer management functions. Communication node 320 can be, for example, a mobile switching center and a mobility management entity, and can be associated with a database such as home or visitor location register.

Communication links 330, 335, 340 and 345 can be wired or wireless communication links analogous to communication links 120 and 125, and further description thereof is omitted for brevity. Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310, communication network 315, communication node 320 and packet inspection node 325 which are omitted for clarity, including additional processing nodes, routers, gateways, and physical and/or wireless data links for carrying data among the various network elements.

Figure 4:
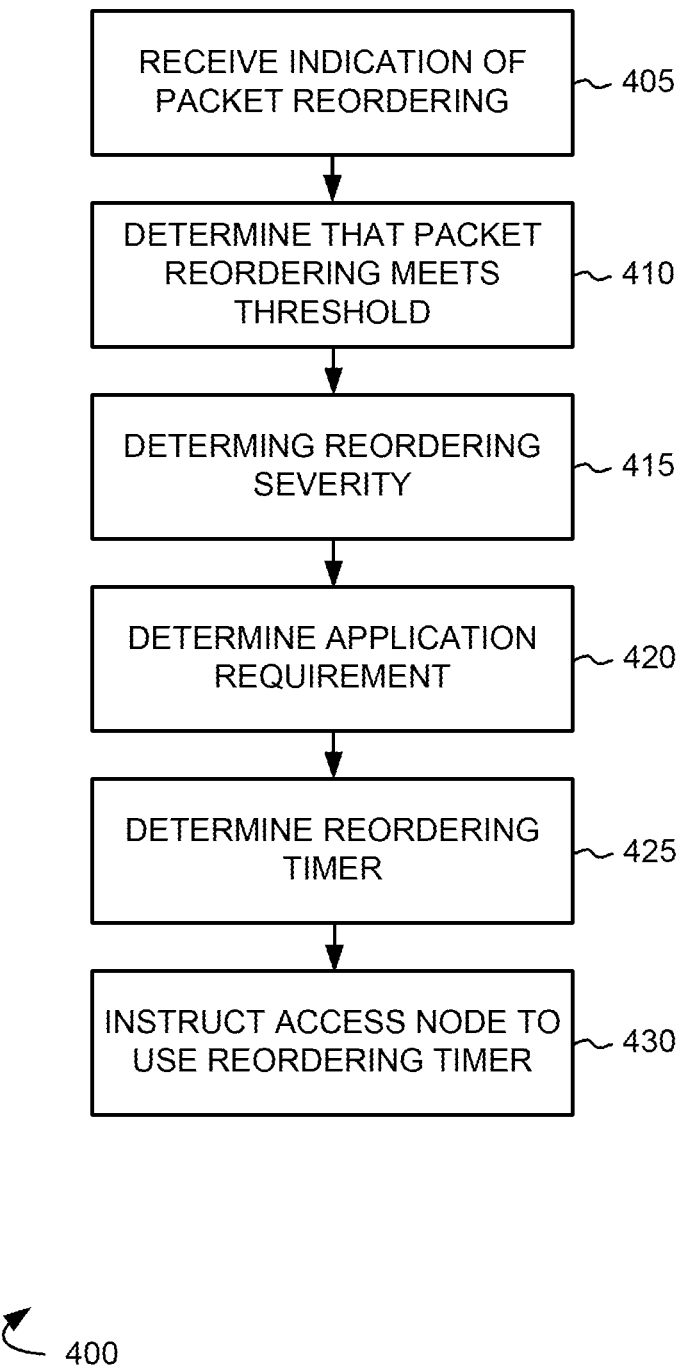
FIG. 4 illustrates another exemplary method of determining a reordering timer.

FIG. 4 illustrates another exemplary method 400 of determining a reordering timer. In operation 405, an indication of packet reordering is received at packet inspection node 325 from access node 310. For example, when a reordering timer of access node 310 elapses without an anticipated packet arriving, access node 310 can send an indication to packet inspection node 325. Packet inspection node 325 can determine that packet reordering of a plurality of data packets meets a reordering threshold (operation 410). For example, if packet inspection node 325 receives a predetermined number of indications of packet reordering within a predetermined time period, packet inspection node 325 can determine that packet reordering meets a threshold. In an embodiment, communication node 320 can also identify a data flow or data stream of wireless device 305 and provide this information to packet inspection node 325.

Packet inspection node 325 examines the plurality of packets when the packet reordering meets the reordering threshold to determine a reordering severity of the plurality of data packets (operation 415). Examining the plurality of packets can further comprise performing deep packet inspection of the plurality of packets to determine the reordering severity of the plurality of data packets. Deep packet inspection (DPI) is a form of computer network packet filtering that examines the data portion, and may also examine the header portion, of a packet as it passes an inspection point. DPI-enabled devices have the ability to look at open systems interconnection (OSI) Layer 2 and beyond OSI Layer 3. This includes headers and data protocol structures as well as the actual payload of the message. In operation, packet inspection node 325 can perform a deep packet inspection of the internet protocol (IP) headers of the plurality of data packets to determine a reordering severity for a given data flow or stream during a predetermined time period. The reordering severity can be based on a reordering block size and/or a reordering delay of the plurality of data packets.

In addition, access node 310 or communication node 320 can provide application requirements of an application running on wireless device 305 which will use the data packets. Wireless device 305 may also provide this information. In an embodiment, the application requirements can further comprise a maximum allowed data delay and a minimum allowed throughput, to ensure sufficient data for the application. Thus, packet inspection node 325 can identify packet reordering severity and application requirements for a data flow or stream.

Based on the determined reordering severity and an application requirement associated with the plurality of data packets, the packet inspection node 325 determines a reordering timer (operation 425). In operation, the packet inspection node 325 determines a value for the reordering timer that can overcome the determined severity of packet reordering while fulfilling the application requirement. Packet inspection node 325 provides access node 310 with the determined reordering timer and instructs access node 310 to use the determined reordering timer (operation 430). Thus, the reordering timer can be dynamically adjusted based on the severity of packet reordering and application requirements.

Figure 5:
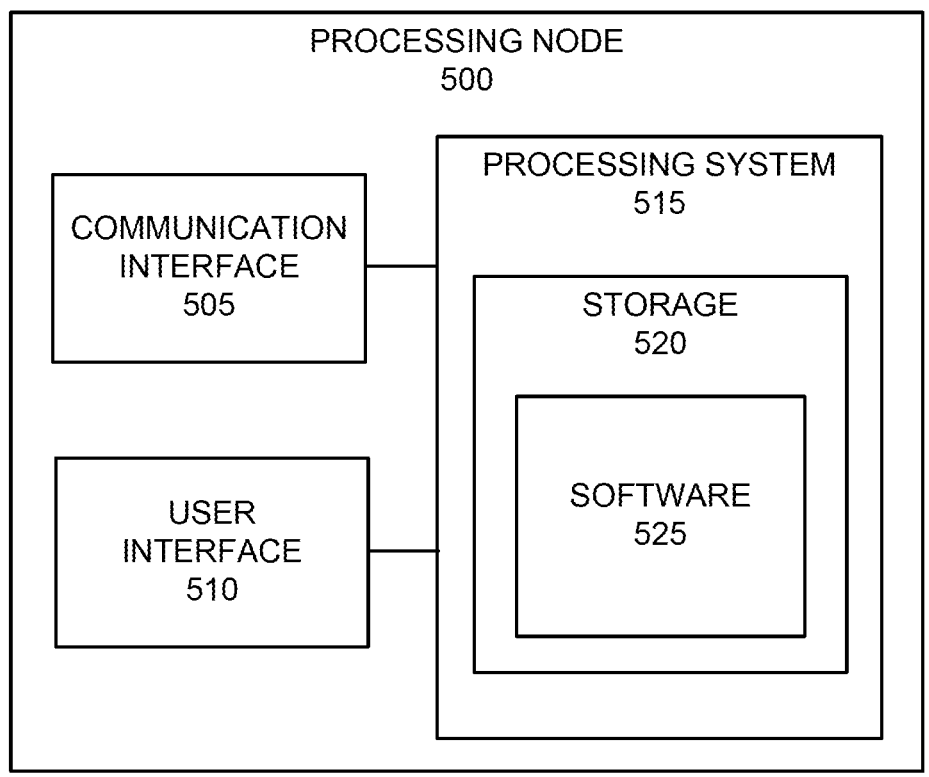
FIG. 5 illustrates an exemplary processing node.

FIG. 5 illustrates an exemplary processing node 500 capable of determining a reordering timer. Processing node 500 comprises communication interface 505, user interface 510, and processing system 515 in communication with communication interface 505 and user interface 510. Processing system 515 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 525 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, and other elements, which are omitted for clarity. Communication interface 505 permits processing node 500 to communicate with other network elements. User interface 510 permits the configuration and control of the operation of processing node 500.

Examples of processing node 500 include packet inspection node 325. Processing node 500 can also be an adjunct or component of a network element, such as an element of access node 310, communication node 320, or network node 115. Processing node 500 can also be another network element in communication system 300 or communication system 100.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining a reordering timer in a wireless communication network, comprising:
  receiving a data flow that includes a plurality of Radio Link Control (RLC) data packets at a network node during a waiting period;
  detecting, at an upper layer of a protocol stack, that at least one expected RLC data packet is not received during the waiting period;
  performing deep packet inspection of the data flow via a packet inspection node at the upper layer of the protocol stack to determine a reordering severity associated with the plurality of RLC data packets, wherein the reordering severity is estimated based on a reordering delay and a reordering block size associated with one or more out of sequence RLC data packets;
  estimating a reordering timer value based on the determined reordering severity and an application requirement of the data flow, wherein the application requirement comprises a maximum allowed data delay and a minimum allowed throughput; and
  instructing an access node to update a waiting period value to the estimated reordering timer value.

2. The method of claim 1, wherein performing deep packet inspection of the data flow further comprises inspecting internet protocol (IP) headers of the plurality of RLC data packets.

3. A network node of a wireless communication system, configured to:
  receive a data flow that includes a plurality of Radio Link Control (RLC) data packets during a predetermined time frame;
  detect at an upper layer of a protocol stack that at least one expected RLC data packet is not received;

perform deep packet inspection of the data flow via a packet inspection node at the upper layer of the protocol stack to determine a reordering severity associated with the plurality of sequenced RLC data packets, wherein the reordering severity is estimated based on a reordering delay and a reordering block size associated with one or more out of sequence RLC data packets;

determine a reordering timer value based on the determined reordering severity and an application requirement of the data flow, wherein the application requirement comprises a maximum allowed data delay and a minimum allowed throughput; and instruct an access node to update the predetermined time frame to the estimated reordering timer value.

4. The network node of claim 3, further configured to inspect internet protocol (IP) headers of the plurality of RLC data packets.

5. A method of determining a reordering timer in a wireless communication network, comprising:

receiving an indication of a packet reordering of a plurality of Radio Link Control (RLC) data packets at an upper layer of a protocol stack of a network node after a timer has expired;

examining a data flow associated with the plurality of data packets at the upper layer of the protocol stack of the network node to determine a reordering severity of the plurality of RLC data packets, wherein the reordering severity is estimated based on a reordering delay and a reordering block size associated with one or more out of sequence RLC data packets; and determining a reordering timer value based on the determined reordering severity and an application requirement of the data flow, wherein the application requirement comprises a maximum allowed data delay and a minimum allowed throughput.

6. The method of claim 1, further comprising:

instructing an access node to update the timer to the determined reordering timer value.

* * * * *